(12) United States Patent
Wallash

(10) Patent No.: US 7,505,229 B1
(45) Date of Patent: Mar. 17, 2009

(54) DISK DRIVE FLEX CABLE WITH ESD CONTACT PAD

(75) Inventor: Albert J. Wallash, Morgan Hill, CA (US)

(73) Assignee: Maxtor Corporation, Scotts Valley, CA (US)

( * ) Notice: Subject to any disclaimer, the term of this patent is extended or adjusted under 35 U.S.C. 154(b) by 278 days.

(21) Appl. No.: 11/031,326

(22) Filed: Jan. 7, 2005

Related U.S. Application Data

(60) Provisional application No. 60/535,009, filed on Jan. 8, 2004.

(51) Int. Cl.
  G11B 5/48 (2006.01)
  G11B 21/16 (2006.01)
  H01H 3/00 (2006.01)
(52) U.S. Cl. .................. 360/245.9; 360/244.1; 361/220
(58) Field of Classification Search .............. 360/245.9, 360/245.8, 323, 244.1, 264.2, 266.3; 361/212, 361/220; 324/207.21
See application file for complete search history.

(56) References Cited

U.S. PATENT DOCUMENTS

| | | | | |
|---|---|---|---|---|
| 5,539,598 A | * | 7/1996 | Denison et al. ............. 360/323 |
| 5,805,390 A | * | 9/1998 | Takeura ..................... 360/323 |
| 5,812,357 A | * | 9/1998 | Johansen et al. ............ 361/212 |
| 5,877,933 A | * | 3/1999 | Johansen et al. ............ 361/220 |
| 5,963,415 A | * | 10/1999 | Johansen ..................... 361/212 |
| 6,034,851 A | * | 3/2000 | Zarouri et al. .............. 360/137 |
| 6,233,127 B1 | * | 5/2001 | Shimazawa ................ 360/323 |
| 6,351,352 B1 | | 2/2002 | Khan et al. ............... 360/264.2 |
| 6,543,673 B2 | | 4/2003 | Lennard et al. .......... 228/179.1 |
| 6,710,983 B2 | | 3/2004 | Voldman .................... 360/323 |
| 6,870,706 B1 | * | 3/2005 | Zhu .......................... 360/128 |
| 6,972,930 B1 | * | 12/2005 | Tang et al. ............... 360/234.5 |
| 2002/0126424 A1 | * | 9/2002 | Tabat et al. ................. 360/323 |
| 2002/0154454 A1 | * | 10/2002 | Kupinski et al. ............ 360/323 |
| 2003/0184920 A1 | * | 10/2003 | Jarrett et al. ................ 360/323 |

* cited by examiner

Primary Examiner—Brian E Miller
Assistant Examiner—Adam B Dravininkas
(74) Attorney, Agent, or Firm—McCarthy Law Group

(57) ABSTRACT

A disk drive electrical interconnect includes one or more electrical contacts for providing a controlled discharge form a disk drive head in a manner that reduces the potential for damaging the head in preparation for testing or the like. In some embodiments the electrical interconnect includes a charge dissipation electrical contact that is interconnected with a read element of the head using an electrical trace. A resistor is disposed in series between the charge dissipation electrical contact and the read element. A probe may engage the charge dissipation electrical contact to remove the electrical charge from the read element at a desired rate because of the resistor. Once the electrical charge has been sufficiently dissipated, another probe may engage another contact of the electrical interconnect to provide a desired electrical signal to the head.

39 Claims, 7 Drawing Sheets

DISK DRIVE FLEX CABLE WITH ESD CONTACT PAD

CROSS-REFERENCE TO RELATED APPLICATIONS

This patent application claims priority under 35 U.S.C. §119(e) to U.S. Provisional Patent Application Ser. No. 60/535,009, that was filed on Jan. 8, 2004, that is entitled "Interconnect with ESD Safe Pad for Sensitive Devices," and the entire disclosure of which is hereby incorporated by reference in its entirety herein.

FIELD OF THE INVENTION

The present embodiments are generally directed to the field of disk drive electrical interconnects and, more particularly, to a disk drive flex cable that includes at least one electrical contact or pad for providing a controlled dissipation of an electrostatic charge or the like.

BACKGROUND OF THE INVENTION

Various types of electrical devices are subject to damage by electrostatic discharge, including disk drive heads such as giant magnetoresistive (GMR) heads. At least some current GMR disk drive head designs have an electrostatic discharge damage level of as little as 2.4 volts. That is, an electrostatic discharge event of as low as 2.4 volts to one of the inputs of a GMR head may damage the GMR head. Future disk drive head designs may have an even lower electrostatic discharge damage level, such as below 1 volt.

A disk drive head gimbal assembly (HGA) includes a load beam or suspension, a flexure, and a slider that carries or contains the disk drive. The flexure provides an interconnection between the suspension and the slider. One way to cause electrostatic discharge damage to a GMR head on an HGA is to make metal contact to one of the GMR head inputs while the GMR head is electrically floating. "Electrically floating" in this sense means that the GMR head has a resistance to ground that is greater than about 1 e12 Ohms. It is important to note that the GMR head is actually designed to have at least this much resistance to its suspension, so unless the GMR inputs are connected to ground already, it is by design and default "electrically floating." If the GMR head is electrically floating, then its voltage is in effect uncontrolled.

For devices that are extremely sensitive to electrostatic discharge, like a GMR head, the metal-contact failure voltage of approximately two volts is easily and frequently exceeded. Since an electrically floating GMR head is not tied to ground, a charge on the insulating interconnect, or any other nearby object, can induce a voltage much greater than 10 volts on the GMR head. As such, metal contact to a GMR input may result in a severe electrostatic discharge current transient that may damage the GMR head in less than 1 nanosecond.

The GMR head may be electrically floating until it is connected to a preamplifier. Various tests may be run on the HGA prior to being electrically connected with a preamplifier. The potential for an electrostatic discharge event thereby exists during the running of these tests. Even after the HGA is attached to a single-ended preamp on a head arm or head stack assembly (collectively the HSA), the potential still exists that the GMR head may be damaged by an electrostatic discharge event.

SUMMARY OF THE INVENTION

In some embodiments a disk drive flex cable that includes a first electrical contact, a first electrical trace, a second electrical contact, and a second electrical trace. The first electrical contact may be in either of two forms—either a static or electrostatic dissipative material (first type) or an electrically conductive material (second type). When the first electrical contact is of the second type, the disk drive flex cable includes a first resistor that is connected in series with the first electrical contact.

The first electrical trace is electrically interconnected with the first electrical contact, and the second electrical trace is electrically interconnected with the second electrical contact. The second electrical trace is also electrically interconnected with a disk drive head when the flex cable is installed. Therefore, an electrical signal may be provided to this second electrical contact (e.g. a head electrical contact) and transmitted to the disk drive head using the second electrical trace (e.g., for testing the head). The first electrical trace is also electrically interconnected with a disk drive component when the flex cable is installed. An electrical charge that may exist on the disk drive component may be dissipated using the first electrical trace and first electrical contact (e.g., a charge dissipation electrical contact) before the above-noted signal is transmitted to the disk drive head using the second electrical contact and second electrical trace.

The flex cable may be of any appropriate size/shape/configuration. In some embodiments the flex cable is in the form of one or more thin flexible sheets of an appropriate material. The flex cable also be referred to as a flex circuit. In any case, the flex cable may be adapted for use with a disk drive having a single suspension assembly (e.g., a single head) or a disk drive having multiple suspension assemblies (e.g., multiple heads.)

The first and second electrical contacts may be of any appropriate size/shape/configuration. The first and second electrical contacts also may be referred to as electrical terminals or pads. Similarly, the first and second traces may be of any appropriate size/shape/configuration. The first and second electrical traces also may be referred to as lines or wires. Principally, the first and second electrical traces must simply be of a form for transmitting an electrical signal.

Some embodiments require that the first resistor have a resistance of at least about 100 kΩ. Other embodiments require that the first resistor have a resistance within a range from about 100 kΩ to about 50 MΩ (inclusive). The first resistor may be of any appropriate type, such as a surface-mounted device or a thin-film device. The first resistor may also be in any appropriate form, such as a single resistive element or a plurality of resistive elements that are integrated to provide a series resistance in accordance with the noted values.

A disk drive suspension assembly may include a suspension and a slider that are interconnected in any appropriate manner (e.g., through an intermediate flexure). The slider may include a head of any appropriate type (e.g., giant magnetoresistive), and the second electrical trace of the flex cable may be electrically interconnected with this head. The disk drive may include a first write element and a first read element.

The flex cable may be integrated with the above-noted suspension assembly such that first electrical trace electrically interconnects the first electrical contact, the first resistor, and the first read element in series, with the first resistor being located between the first electrical contact and the first read element. The flex cable may also include a third electrical contact, a third electrical trace, and a second resistor. The flex cable may be integrated with the suspension assembly such that the third electrical trace electrically interconnects the third electrical contact, the second resistor, and the first write element in series, with the second resistor being located between the third electrical contact and the first write element. The second resistor may be in accordance with the discussion presented above regarding the first resistor.

A disk drive head positioner assembly may incorporate both the above-noted suspension assembly and the flex cable. One option would be to incorporate the flex cable with the suspension assembly in the above-noted manner. Another option would be to incorporate the flex cable such that the first electrical trace electrically interconnects the first electrical contact, the first resistor and a first metal component of the disk drive head positioner assembly in series, where the first resistor is located between the first electrical contact and the first metal component. In some embodiments the first metal component is an actuator body and or an actuator/head arm.

The first electrical contact may be in the form of a static dissipative material as noted above. Preferably, the first electrical contact in this form itself has a resistance of at least about 100 kΩ in some embodiments, and a resistance within a range from about 100 kΩ to about 50 MΩ (inclusive) in other embodiments. Having a first electrical of this type may alleviate a need for the above noted first resistor in the various configurations presented above. Similarly, the above-noted third electrical contact also may be in the form of a static dissipative material having a resistance of at least about 100 kΩ in some embodiments, and a resistance within a range from about 100 kΩ to about 50 MΩ (inclusive) in other embodiments. Having a third electrical contact of this type may alleviate a need for the above-noted second resistor in the various configurations presented above.

All combinations of the two types of first electrical contacts and third electrical contacts (both being charge dissipation electrical contacts) may be used. For instance, the first electrical contact may be in the form of a conductive material such that the first resistor is used to control the discharge, and the third electrical contact also may be in the form of a conductive material such that the second resistor is used to control the discharge. A second option would be for the first electrical contact to be in the form of a static dissipative material such that the first resistor is not used, and for the third electrical contact to also be in the form of a static dissipative material such that the second resistor is not used. A third option would be for the first electrical contact to be in the form of a static dissipative material such that the first resistor is not used, and for the third electrical contact to be in the form of a conductive material such that the second resistor is used to control the discharge. A fourth option would be for the first electrical contact to be in the form of a conductive material such that the first resistor is used to control the discharge, and for the third electrical contact to be in the form of a static dissipative material such that the second resistor is not used.

Some embodiments are directed to what may be characterized as a disk drive electrical interconnect that includes a first electrical contact, a first electrical trace that is electronically interconnected with the first electrical contact, a second electrical contact, and a second electrical trace that is electrically interconnected with the second electrical contact. The second electrical trace is also electrically interconnected with a disk drive head when the flex cable is installed. Therefore, an electrical signal may be provided to this second electrical contact (e.g., a head electrical contact) and transmitted to the disk drive head using the second electrical trace (e.g., for testing the head). The first electrical trace is also electrically interconnected with a disk drive component when the flex cable is installed. An electrical charge that may exist on the disk drive component may be dissipated through the first electrical trace and first electrical contact (e.g., a charge dissipation electrical contact) before the above-noted signal is transmitted to the disk drive head through the second electrical contact and second electrical trace. The series resistance from the disk drive component, up to including the first electrical contact, is greater than the series resistance from the disk drive head up to and including the second electrical contact.

The disk drive electrical interconnect may be of any appropriate size/shape/configuration. In some embodiments at least part of the disk drive electrical interconnect is in the form of a flexible substrate. The first and second electrical contacts, as well as at least part of the first and second electrical traces, may be disposed on this flexible substrate. In other embodiments at least part of the disk drive electrical interconnect is in the form of a flex cable. The first and second electrical contacts, as well as at least part of the first and second electrical traces, may be disposed on or be part of this flex cable.

The series resistance from the disk drive component, up to and including the first electrical contact (e.g., a charge dissipation electrical contact), may be at least about 100 kΩ The series resistance from the disk drive component, up to and including the first electrical contact, may be within a range from about 100 kΩ to about 50 MΩ (inclusive)

A disk drive suspension assembly may include a suspension and a slider that are interconnected in any appropriate manner (e.g., through an intermediate flexure). The slider may include a head of any appropriate type (e.g., giant magnetoresistive), and the second electrical trace of the flex cable may be electrically interconnected with this head. The disk drive head may include a first write element and a first read element.

The disk drive electrical interconnect may be integrated with the above-noted suspension assembly such that the first electrical trace electrically interconnects the first electrical contact and the first read element in series. The disk drive electrical interconnect may also include a third electrical contact (e.g., another charge dissipation electrical contact) and a third electrical trace. The third electrical trace may electrically interconnect the third electrical contact and the first write element in series. The series resistance from the first write element, up to and including the third electrical contact, may be greater than the series resistance from the disk drive head, up to and including the second electrical contact.

A disk drive head positioner assembly may incorporate both the above-noted suspension assembly and the disk drive electrical interconnect. Some embodiments incorporate the disk drive electrical interconnect with the suspension assembly in the above-noted manner. Some embodiments incorporate the disk drive electrical interconnect such that the first electrical trace electrically interconnects the first electrical contact and a first metal component of the disk drive head positioner assembly in series. In some embodiments the first component is an actuator body and/or an actuator/head arm.

Some embodiments are generally directed to a method for making a disk drive suspension assembly. The suspension assembly includes a suspension, as well as a slider that includes a head and that is appropriately interconnected with the suspension. A first electrical contact is engaged with a first probe. An electrical charge is reduced by directing at least a portion of the electrical charge through a series resistance of at least about 100 kΩ before reaching the first probe. A second electrical contact that spaced from the first electrical contact is engaged with a second probe. The engagement with the second probe is initiated after the above-noted charge has been reduced in at least some respect. An electrical signal is then provided to the head through the second probe and the second electrical contact.

In some embodiments the second electrical contact is engaged by the second probe to execute at least some type of test in relation to the suspension assembly. For instance, this may be used to test the head, including its read element, its write element, or both. The engagement of the first probe with the first electrical contact may reduce the potential for the head becoming damaged by an electrostatic discharge or the like.

The head may include a first write element and a first read element. At least a portion of the electrical charge may be transmitted from the first read element to the first electrical contact, and to the first probe. A third electrical contact that is spaced from the first and second electrical contacts may be engaged by a third probe. At least a portion of an electrical charge from the first write element may be transmitted through a series resistance of at least about 100 kΩ before reaching the third probe. Both the first and third probes may remain engaged with the first and third electrical contacts, respectively, throughout the engagement of the second probe with the second electrical contact.

DETAILED DESCRIPTION OF THE INVENTION

Figure 1:
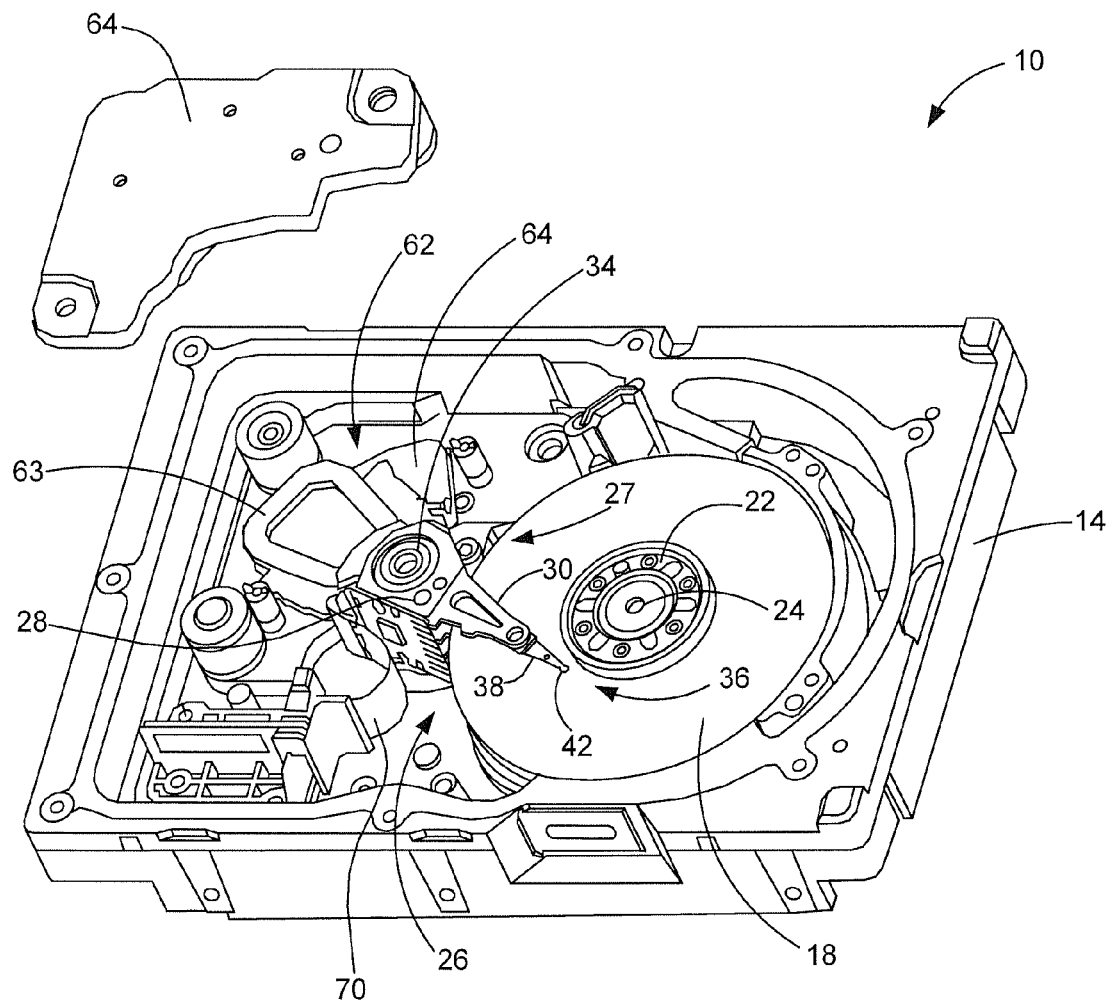
FIG. 1 is a perspective view of a related art disk drive that may be adapted to incorporate a flex cable with an ESD contact pad in accordance with FIGS. 5-7
Figure 2:
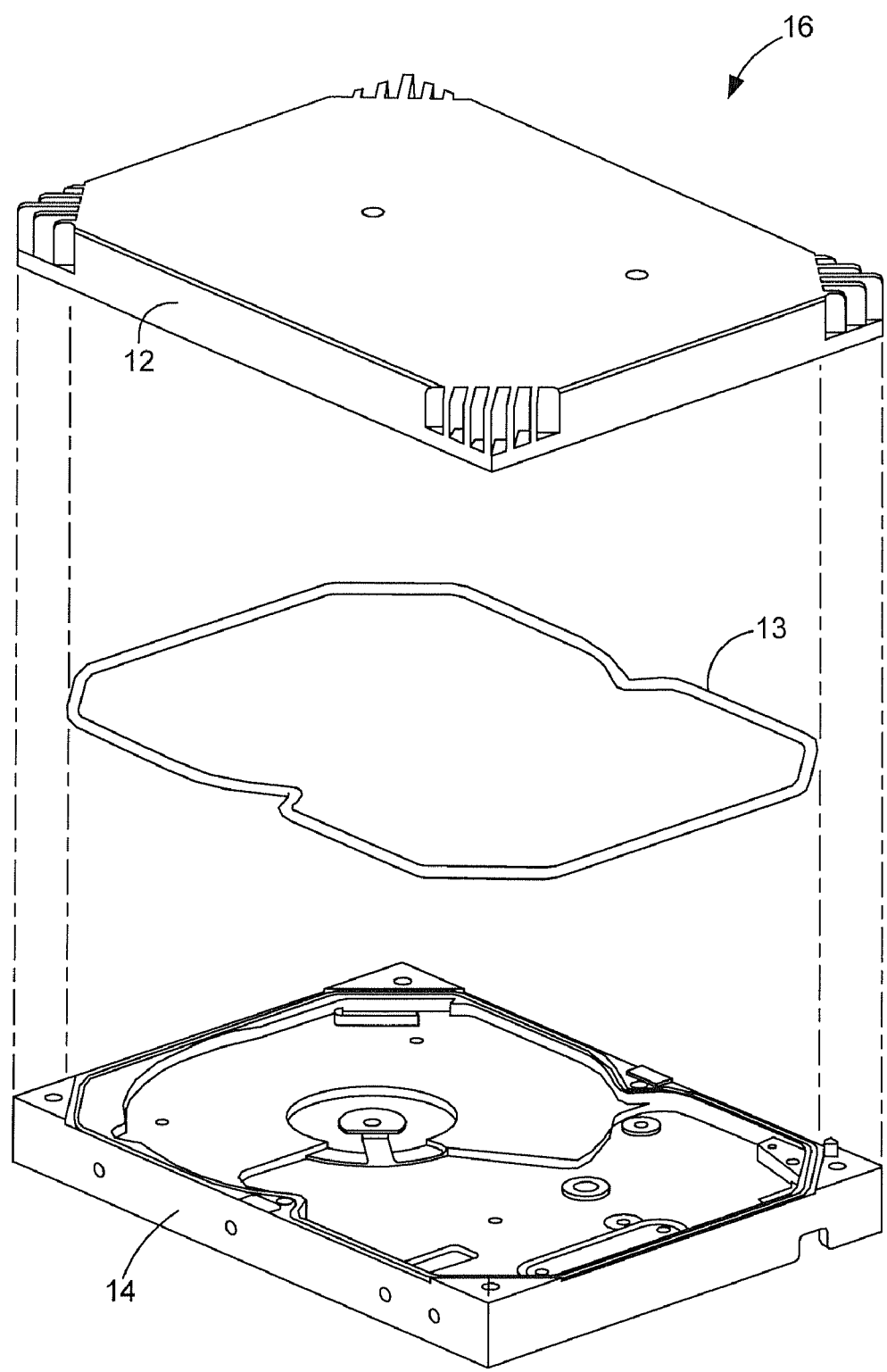
FIG. 2 is an exploded, perspective view of a related art disk drive housing for the disk drive of FIG. 1.

A related art disk drive 10 is illustrated in FIGS. 1-4. However, this disk drive 10 may be adapted to incorporate a flex cable that removes a charge from a head as discussed below in relation to FIGS. 5-7, in accordance with embodiments of the present invention. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub by a disk clamp 22, and the hub is rotatably interconnected with the disk drive base plate 14 and/or cover 12. A spindle motor rotates the hub and attached clamp 22 about a shaft 24 of the spindle motor to simultaneously spin the data storage disk(s) 18 at an appropriate rate.

The disk drive 10 also includes a head positioner assembly 26, that in turn includes an actuator 27. The actuator 27 is in the form of an actuator body 28 having one or more individual rigid actuator or head arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 are disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more rigid actuator arms that are each mounted on the pivot bearing 34.

Movement of the head positioner assembly 26 is provided by an appropriate head stack assembly drive, such as a voice coil motor 62 or the like. The voice coil motor 62 may be characterized as a rotary drive. The voice coil motor 62 is a magnetic assembly that controls the movement of the head positioner assembly 26 under the direction of control electronics 66. Typical components of the voice coil motor 62 are a coil 63 that may be mounted on the head positioner assembly 26, and a separate voice coil motor magnet assembly, ("VCM Assembly") 64 that is disposed above and below this coil 63 (the upper VCM assembly 64 being "exploded away" in FIG. 1). The VCM magnet assemblies 64 will typically be mounted on the housing 16 in a fixed position, with the upper VCM assembly 64 being appropriately supported above the lower VCM assembly. Any appropriate head positioner assembly drive type may be utilized by the disk drive 10, including a linear drive (for the case where the head positioner assembly 26 is interconnected with the base plate 14 and/or cover 12 for linear movement versus the illustrated pivoting movement about the pivot bearing 34), as well as other types of rotational/pivoting drives.

A suspension or head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the head positioner assembly 26. Typically the suspension 38 of each HGA 36 is biased at least generally toward its corresponding disk 18 by a spring-like force. A slider 42 is disposed at or near the free end of each suspension 38. A flexure (not shown) is typically utilized to interconnect the suspension 38 and the slider 42. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the head positioner assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 "across" the corresponding data storage disk 18 to position the head 44 at the desired/required radial position on the disk 18 (i.e., at the correct track on the data storage disk 18) for disk drive read/write operations.

When the disk drive 10 is not in operation, the head positioner assembly 26 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 may include a ramp assembly that is disposed beyond a perimeter of the data storage disk 18 to typically both move the corresponding slider 42 vertically away from its corresponding data storage disk 18 and to also exert somewhat of a retaining force on the corresponding actuator arm 30. Any configuration for the ramp assembly that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 may include an actuator arm assembly latch that moves from a non-latching position to a latching position to engage an actuator arm 30 so as to preclude the same from pivoting in a direction which would tend to drag the slider(s) 42 across its corresponding data storage disk 18.

Figure 3:
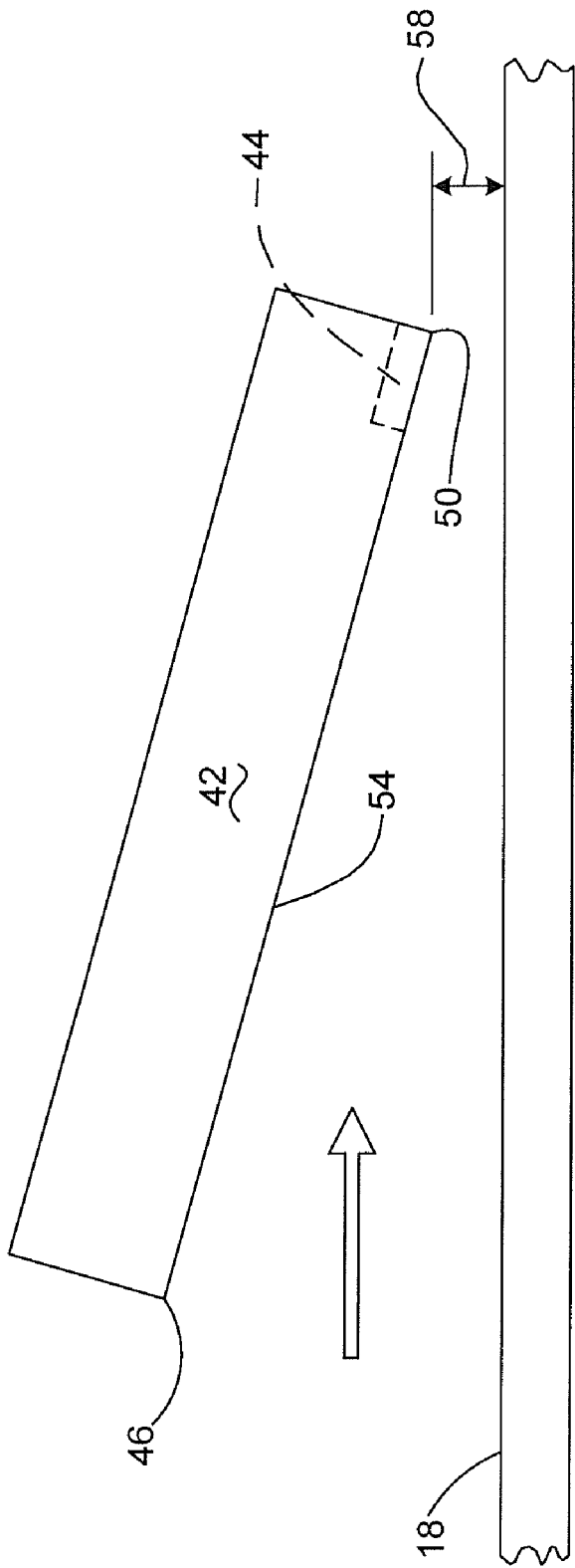
FIG. 3 is a schematic representation of a related art flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
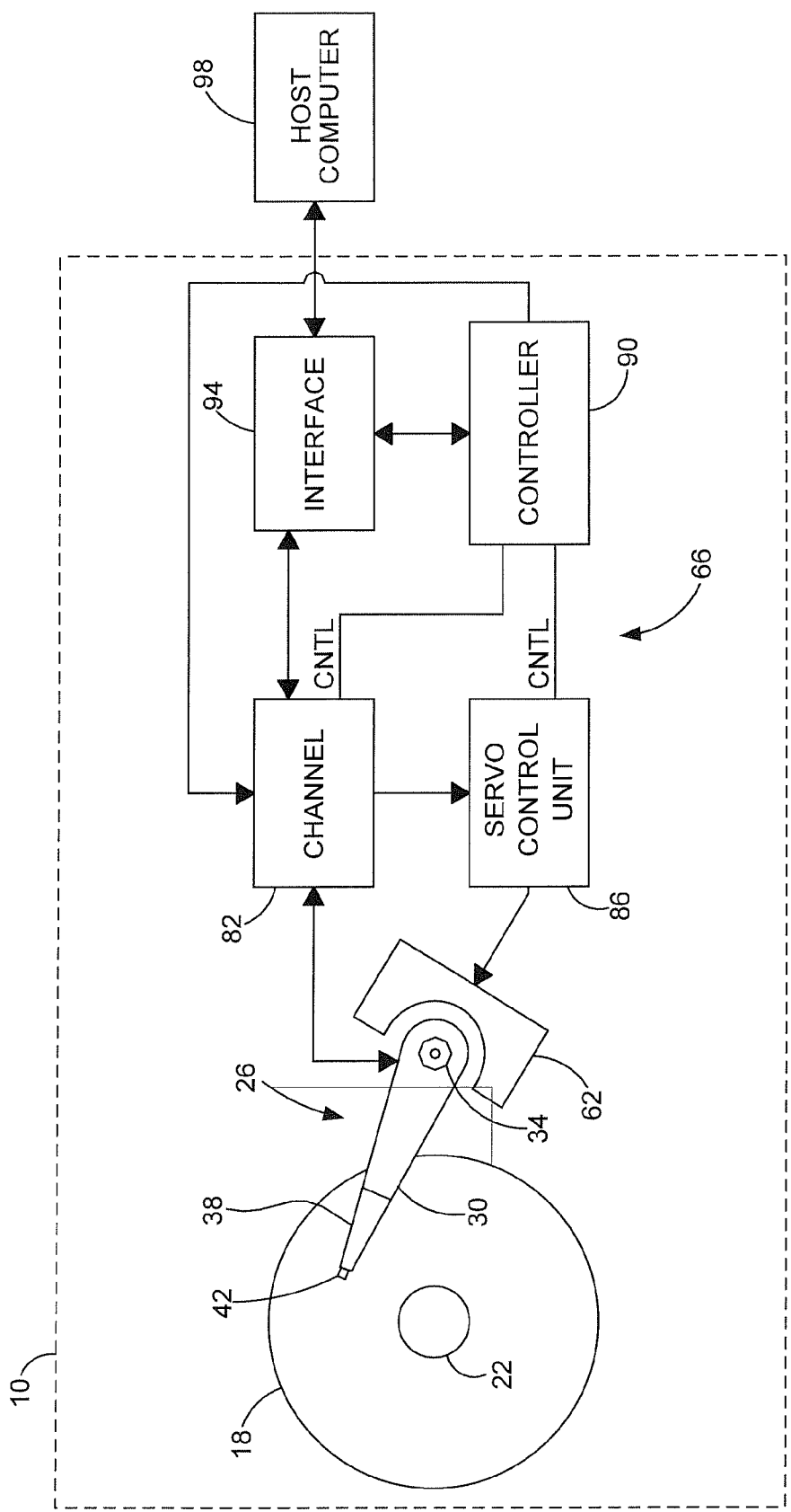
FIG. 4 is a simplified related art electrical component block diagram of the disk-drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In some embodiments the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

Figure 5:
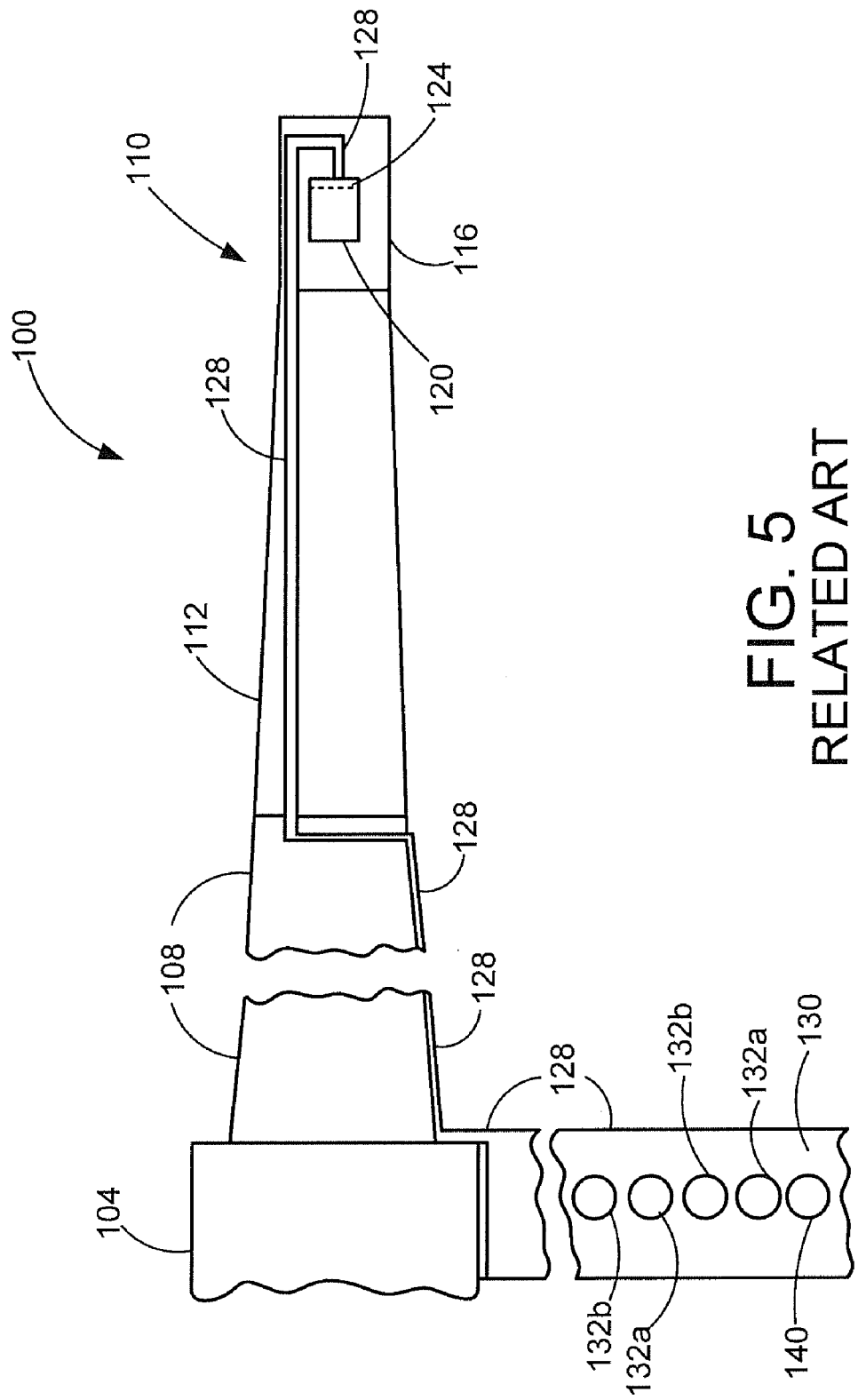

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98. A head positioner assembly 100 is illustrated in FIG. 5. The head positioner assembly 100 may be used in place of the head positioner assembly 26 that was discussed above in relation to the disk drive 10, or may be used in any other appropriate disk drive for that matter. The head positioner assembly 100 includes an actuator body 104 of any appropriate size/shape/configuration that is mounted on a pivot bearing or the like. One or more actuator or head arms 108 of any appropriate size/shape/configuration extend from the actuator body 104. Each actuator arm 108 could be of a configuration so as to be separately/individually mounted on a pivot bearing as well.

What may be characterized as a suspension assembly or a head gimbal assembly 110 is appropriately interconnected with each actuator arm 108. The suspension assembly 110 includes a suspension 112 and a slider 120 (flying type or otherwise) that are interconnected by a flexure 116. The suspension 112, flexure 116, and slider 120 each may be of any appropriate size/shape/configuration. Any appropriate way of interconnecting the slider 120 with the suspension 112 could be utilized as well.

The slider 120 includes a head 124 of any appropriate type (e.g., giant magnetoresistive). Electrical signals are exchanged between the head 124 and the printed circuit board or control electronics of the disk drive via a disk drive electrical interconnect 128, at least part of which may be in the form of a flex cable. Therefore, the disk drive electrical interconnect 128 includes what may be characterized a flexible substrate 130. All or any portion of the disk drive electrical interconnect 128 may be in the form of the flexible substrate 130.

The disk drive electrical interconnect 128 may be of any appropriate size/shape/configuration, and further may be integrated with the head positioner assembly 100 in any appropriate manner. For instance, a portion of the disk drive electrical interconnect 128 (including part of the flexible substrate 130) could be mounted on any appropriate surface of the suspension assembly 110 prior to mounting the suspension assembly 110 on its corresponding actuator arm 108. Another portion of the disk drive electrical interconnect 128 (including part of the flexible substrate 130) may be mounted on any appropriate surface of the actuator arm 108 and/or the actuator body 104. Still another portion of the disk drive electrical interconnect 128 (including part of the flexible substrate 130) may be mounted on the base plate of the disk drive. In any case, typically an appropriate connector will be provided on a free end of the disk drive electrical interconnect 128 for attachment to the drive's printed circuit board. It should be appreciated that the disk drive electrical interconnect 128 provides electrical connectivity for each head 124 used by the drive. Therefore, the following discussion regarding a single head 124 is equally applicable to each head 124 used by the drive.

As noted above, the disk drive electrical interconnect 128 may be of any appropriate configuration. Typically the flexible substrate 130 of the disk drive electrical interconnect 128 will be in the form of one or more sheets of any appropriate flexible material. In any case, the disk drive electrical interconnect 128 includes a plurality of head electrical terminals, contacts, or pads 132a (hereafter also referred to as head input electrical contacts 132a) and 132b (hereafter also referred to as head output electrical contacts 132b) for providing an electrical signal to or receiving from the head 124. Typically the head electrical contacts 132a, 132b will be used for conducting a test of some kind, although the head electrical contacts 132a, 132b may be used for any appropriate purpose. One or more other electrical contacts may be used by the disk drive electrical interconnect 128 and may interconnect with any appropriate structure (e.g., one or more electrical contacts for a heater on the slider 120).

One or more test probes or the like may be brought in to contact with one or more of the head electrical contacts 132a, 132b on the disk drive electrical interconnect 128 prior to the time when the various components of the drive are enclosed between the cover and base plate. It may be such that an electrical charge of an undesired magnitude exists on the suspension assembly 110 at this time. Contacting a test probe with a particular head electrical contact 132a, 132b may remove this electrical charge from the suspension assembly 112 in a manner that damages the head 124 in at least some respect. In order to reduce the potential for damaging the head 124 in such a case, the disk drive electrical interconnect 128 also includes at least one charge dissipation electrical contact 140 that allows for removal of this electrical charge over a desired time period or otherwise in a manner that reduces the potential for damaging the head 124. In other words a transient current results from the flow of this electrical charge, and this transient current may damage the head 124 if directed into a probe contacting a head electrical contact 132a, 132b versus into a probe contacting the charge dissipation electrical contact 140.

Figure 6:
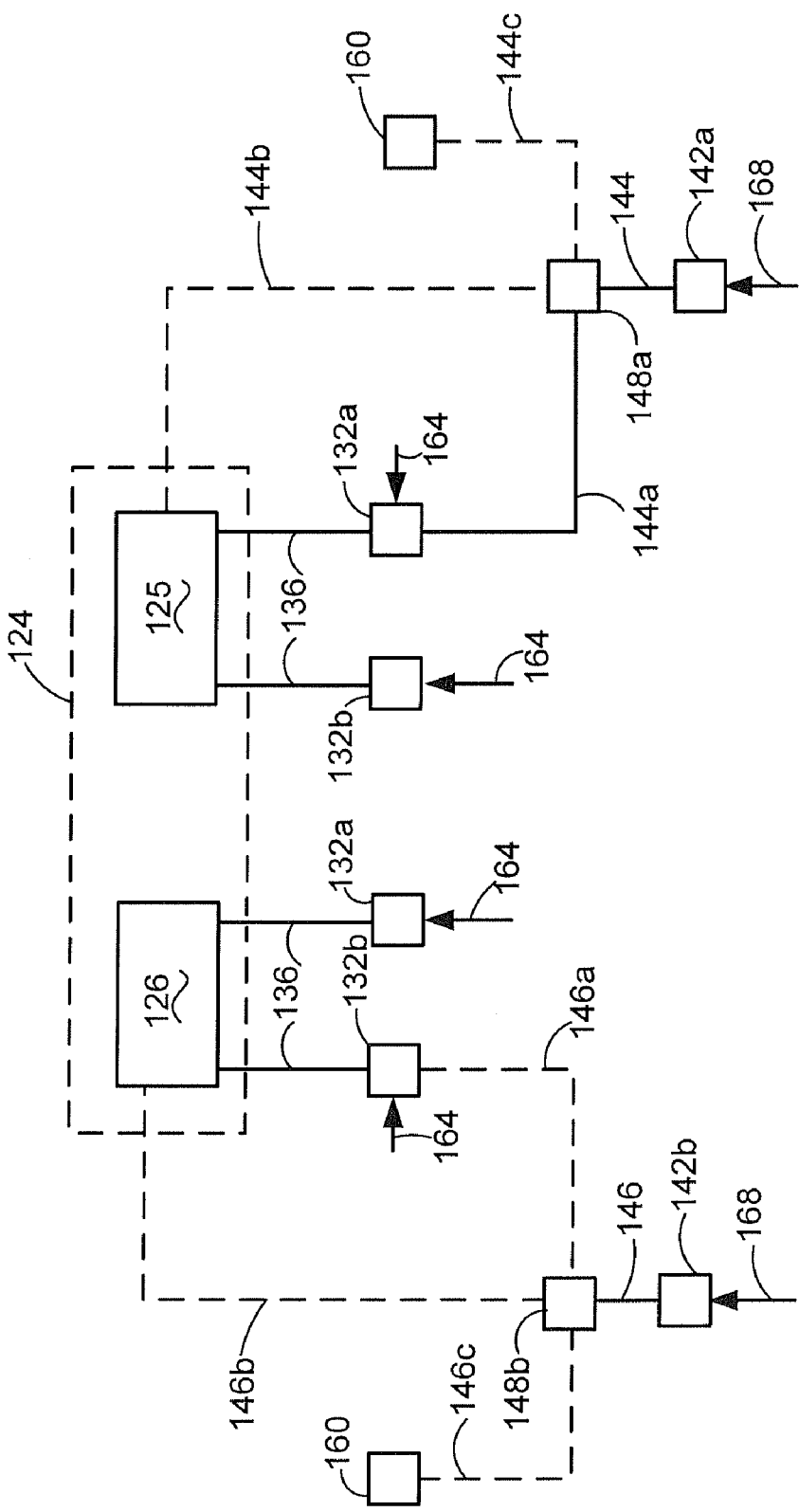

FIG. 6 presents a schematic of one embodiment of the head 124 from the suspension assembly 110 of FIG. 5. The head 124 in this case includes a read element 125 and a write element 126. A head input electrical contact 132a and a head output electrical contact 132b are provided for both the read element 125 and the write element 126 of the head 124. Electrical traces 136 extend from each head electrical contact 132a, 132b to the respective read element 125 or write element 126.

A number of options exist for controlling a discharge from the suspension assembly 110 using the disk drive electrical interconnect 128 of FIG. 5 and for the configuration of the head 124 presented in FIG. 6. The charge dissipation electrical contact 140 of the disk drive electrical interconnect 128 from FIG. 5 may be in the form of a charge dissipation electrical contact 142a that is electrically interconnected with the read element 125 of the head 124 in accordance with FIG. 6. Generally, the series resistance from the read element 125 of the head 124, up to and including the charge dissipation electrical contact 142a, should be larger than the series resistance from the read element 125 of the head 124, up to and including its head input electrical contact 132a, and should also be larger than the series resistance from the read element 125 of the head 124, up to and including its head output electrical contact 132b.

The charge dissipation electrical contact 142a would typically be in the form of an electrically conductive material, and may be electrically interconnected with the read element 125 of the head 124 in any appropriate manner. Generally, a resistor 148a is connected in series with the electrical contact 142a and the read element 125. Both surface mounted and thin-film deposited configurations are appropriate for the resistor 148a. What is desired is that the resistor 148a have a resistance that will control the discharge from the read element 125 in a desired manner. In one embodiment, the resistor 148a has a resistance of at least about 100 kΩ (e.g., 100,000 Ohms). In another embodiment, the resistor 148a has a resistance within a range from about 100 kΩ (e.g., 100,000 Ohms) to about 50 MΩ (e.g., 50,000,000 Ohms), inclusive. Other resistances may be appropriate depending upon the particular situation at hand. Generally, the electrical charge should be discharged through the charge dissipation electrical contact 142a at a rate that should not damage the head 124. The general objective is to have a sufficiently high resistance to limit the magnitude of the transient current to a safe or reasonable level, yet also have a sufficiently low resistance so that the amount of time required to remove the electrical charge is not excessive. The resistor 148a may be in any appropriate form, including a single resistor or a combination of resistors that provide the desired resistance.

One way of establishing an electrical path between the charge dissipation electrical contact 142a and the read element 125 of the head 124 is to have an electrical trace 144 that extends from the charge dissipation electrical contact 142a to the resistor 148a, and to have an electrical trace 144a that extends from the resistor 148a to one of the head electrical contacts 132a, 132b associated with the read element 125 (the head input electrical contact 132a in the illustrated embodiments). Another way of establishing an electrical path between the charge dissipation electrical contact 142a and the read element 125 of the head 124 is to have an electrical trace 144 that extends from the electrical contact 142a to the resistor 148a, and to have an electrical trace 144b that extends from the resistor 148a directly to the read element 125 itself.

Prior to establishing contact with any of the head electrical contacts 132a, 132b of the disk drive electrical interconnect 128, a charge dissipation probe 168 or the like may be used to engage the charge dissipation electrical contact 142a of the disk drive electrical interconnect 128. An electrical charge that may exist on the read element 125 of the head 124 should thereby pass through the resistor 148a prior to reaching the charge dissipation electrical contact 142a. The charge dissipation probe 168 may remain engaged with the charge dissipation electrical contact 142a until the electrical charge should be sufficiently dissipated from the read element 125. Subsequent engagement of one or more test probes 164 or the like with one or more of the head electrical contacts 132a, 132b associated with the read element 125 should not damage the head 124 as a result of any electrical charge being rapidly transmitted from the read element 125 to any of its head electrical contacts 132a, 132b. Although the charge dissipation probe 168 could be disengaged from the charge dissipation electrical contact 142a at substantially the same time or after another test probe 164 has engaged any head electrical contact 132a, 132b associated with the read element 125 of the head 124, it may be preferable to leave the charge dissipation probe 168 engaged with the charge dissipation electrical contact 142a throughout the time that any test probe 164 is engaged with any of the head electrical contacts 132a, 132b for the read element 125 of the head 124. Once each test probe 164 is removed from each head electrical contact 132a, 132b of the disk drive electrical interconnect 128, the charge dissipation probe 168 may be removed from the charge dissipation electrical contact 142a of the disk drive electrical interconnect 128 as well.

Sufficient dissipation of the electrical charge from the suspension assembly 110 in accordance with the foregoing may not necessarily require that the charge dissipation electrical contact 142a of the disk drive electrical interconnect 128 be electrically interconnected with the read element 125 of the head 124. Other portions of the suspension assembly 110 or the head positioner assembly 100 may be at the same potential as the read element 125 of the head 124. It also may be that an electrical charge exists on the suspension assembly 110 that may not be removed via the read element 125. In this regard, the charge dissipation electrical contact 142a may be electrically interconnected with any appropriate metal component 160 of the head positioner assembly 100 using an electrical trace 144c. For instance, the metal component 160 could be in the form of the actuator arm 108 or the actuator body 104. The resistor 148a is then disposed between the metal component 160 and the charge dissipation electrical contact 142a, and this resistor 148a may be in accordance with the above-noted resistance values. Generally, the series resistance from the metal component 160, up to and including the charge dissipation electrical contact 142a, may be larger than the series resistance from the read element 125 of the head 124, up to and including its head input electrical contact 132a, and may also be larger than the series resistance from the read element 125 of the head 124, up to and including its head output electrical contact 132b.

The charge dissipation electrical contact 140 of the disk drive electrical interconnect 128 from FIG. 5 also may be in the form of a charge dissipation electrical contact 142b that is electrically interconnected with the write element 126 of the head 124 in accordance with FIG. 6. Generally, the series resistance from the write element 126 of the head 124, up to and including the charge dissipation electrical contact 142b, should be larger than the series resistance from the write element 126 of the head 124, up to and including its head input electrical contact 132a, and should also be larger than the series resistance from the write element 126 of the head 124, up to and including its head output electrical contact 132b.

The charge dissipation electrical contact 142b would typically be formed of an electrically conductive material, and may be electrically interconnected with the write element 126 of the head 124 in any appropriate manner. Generally, a resistor 148b is connected in series with the change dissipation electrical contact 142b and the write element 126. Both surface mounted and thin-film deposited configurations are appropriate for the resistor 148b. What is desired is that the resistor 148b have a resistance that will control the discharge from the write element 126 in a desired manner. In one embodiment, the resistor 148b has a resistance of at least about 100 kΩ (e.g., 100,000 Ohms). In another embodiment, the resistor 148b has a resistance within a range of about 100 kΩ (e.g., 100,000 Ohms) to about 50 MΩ (e.g., 50,000,000 Ohms), inclusive. Other resistances may be appropriate depending upon the particular situation at hand. Generally, the electrical charge should be discharged through the charge dissipation electrical contact 142b at a rate that should not damage the head 124. The general objective is to have a sufficiently high resistance to limit the magnitude of the transient current to a safe or reasonable level, yet also have a sufficiently low resistance so that the amount of time required to remove the charge is not excessive. The resistor 148b may be in any appropriate form, including a single resistor or a combination of resistors that provide the desired resistance.

One way of establishing an electrical path between the charge dissipation electrical contact 142b and the write element 126 of the head 124 is to have on electrical trace 146 that extends from the charge dissipation electrical contact 142b to the resistor 148b, and to have an electrical trace 146a that extends from the resistor 148b to one of the head electrical contacts 132a, 132b associated with the write element 126 (e.g., the head input electrical contact 132b in the illustrated embodiments). Another way of establishing an electrical path between the charge dissipation electrical contact 142b and the write element 126 of the head 124 is to have an electrical trace 146 that extends from the electrical contact 142b to the resistor 148b, and to have an electrical trace 146b that extends from the resistor 148a directly to the write element 126 itself.

Prior to establishing contact with any of the head electrical contacts 132 of the disk drive electrical interconnect 128, a charge dissipation probe 168 or the like may be used to engage the charge dissipation electrical contact 142b of the disk drive electrical interconnect 128. An electrical charge that may exist on the write element 126 of the head 124 should thereby pass through the resistor 148b prior to reaching the charge dissipation electrical contact 142b. The charge dissipation probe 168 may remain engaged with the charge dissipation electrical contact 142b until the electrical charge should be sufficiently dissipated from the write element 126. Subsequent engagement of one or more test probes 164 with of one or more of the head electrical contacts 132a, 132b associated with the write element 126 should not damage the head 124 as a result of any electrical charge being rapidly transmitted from the write element 126 to any of its head electrical contacts 132a, 132b. Although the charge dissipation probe 168 could be disengaged from the charge dissipation electrical contact 142b at substantially the same time or after another test probe 164 has engaged any head electrical contact 132a, 132b associated with the write element 126 of the head 124, it may be preferable to leave the charge dissipation probe 168 engaged with the charge dissipation electrical contact 142b throughout the time that any test probe 164 is engaged with any of the head electrical contacts 132a, 132b for the write element 126 of the head 124. Once each probe 164 is removed from each head electrical contact 132a, 132b of the disk drive electrical interconnect 128, the charge dissipation probe 168 may be removed from the charge dissipation electrical contact 142b of the disk drive electrical interconnect 128 as well.

Sufficient dissipation of the electrical charge from the suspension assembly 110 in accordance with the foregoing may not necessarily require that the charge dissipation electrical contact 142b of the disk drive electrical interconnect 128 be electrically interconnected with the write element 126 of the head 124. Other portions of the suspension assembly 110 or the head positioner assembly 100 may be at the same potential as the write element 126 of the head 124. It also may be that an electrical charge exists on the suspension assembly 110 that may not be removed via the write element 126. In this regard, the charge dissipation electrical contact 142b should be electrically interconnected with any appropriate metal component 160 of the head positioner assembly 100 using an electrical trace 146c. For instance, the metal component 160 could be in the form of the actuator arm 108 or the actuator body 104. The resistor 148b is then disposed between the metal component 160 and the charge dissipation electrical contact 142b, and this resistor 148b may be in accordance with the above-noted resistance values. Generally, the series resistance from the metal component 160, up to and including the charge dissipation electrical contact 142b, may be larger than the series resistance from the write element 126 of the head 124, up to and including its head input electrical contact 132a, and may also be larger that the series resistance from the write element 126 of the head 124, up to and including its head output electrical contact 132b.

It may be preferable to engage each of the charge dissipation electrical contact 142a (to dissipate an electrical charge from the read element 125 of the head 124) and the charge dissipation electrical contact 142b (to dissipate an electrical charge from the write element 126 of the head 124) with a separate test probe 168 prior to establishing an external electrical contact with any of the head electrical contacts 132a, 132b. For instance, it may be possible that a voltage exists on the write element 126 of the head 124 that would not be dissipated through the charge dissipation electrical contact 142a that is electrically connected with the read element 125, and/or that a voltage exists on the read element 125 of the head 124 that would not be dissipated through the charge dissipation electrical contact 142b that is electrically connected with the write element 126. It also may be desirable to electrically interconnect one charge dissipation electrical contact 142a and resistor 148a in series with the read element 125 of the head 124, to electrically interconnect another charge dissipation electrical contact 142a and resistor 148a in series with a metal component 160, and to contact each such charge dissipation electrical contact 142a with separate charge dissipation probes 168 prior to contacting a test probe 164 with one of the head electrical contacts 132a, 132b. In addition, it may be desirable to electrically interconnect one charge dissipation electrical contact 142b and resistor 148b in series with the write element 126 of the head 124, to electrically interconnect another charge dissipation electrical contact 142b and resistor 148b in series with a metal component 160, and to contact each such charge dissipation electrical contact 142b with separate charge dissipation probes 168 prior to contacting a test probe 164 with one of the head electrical contacts 132a, 132b. Any combination of the various options discussed in relation to FIG. 6 may be used.

Figure 7:
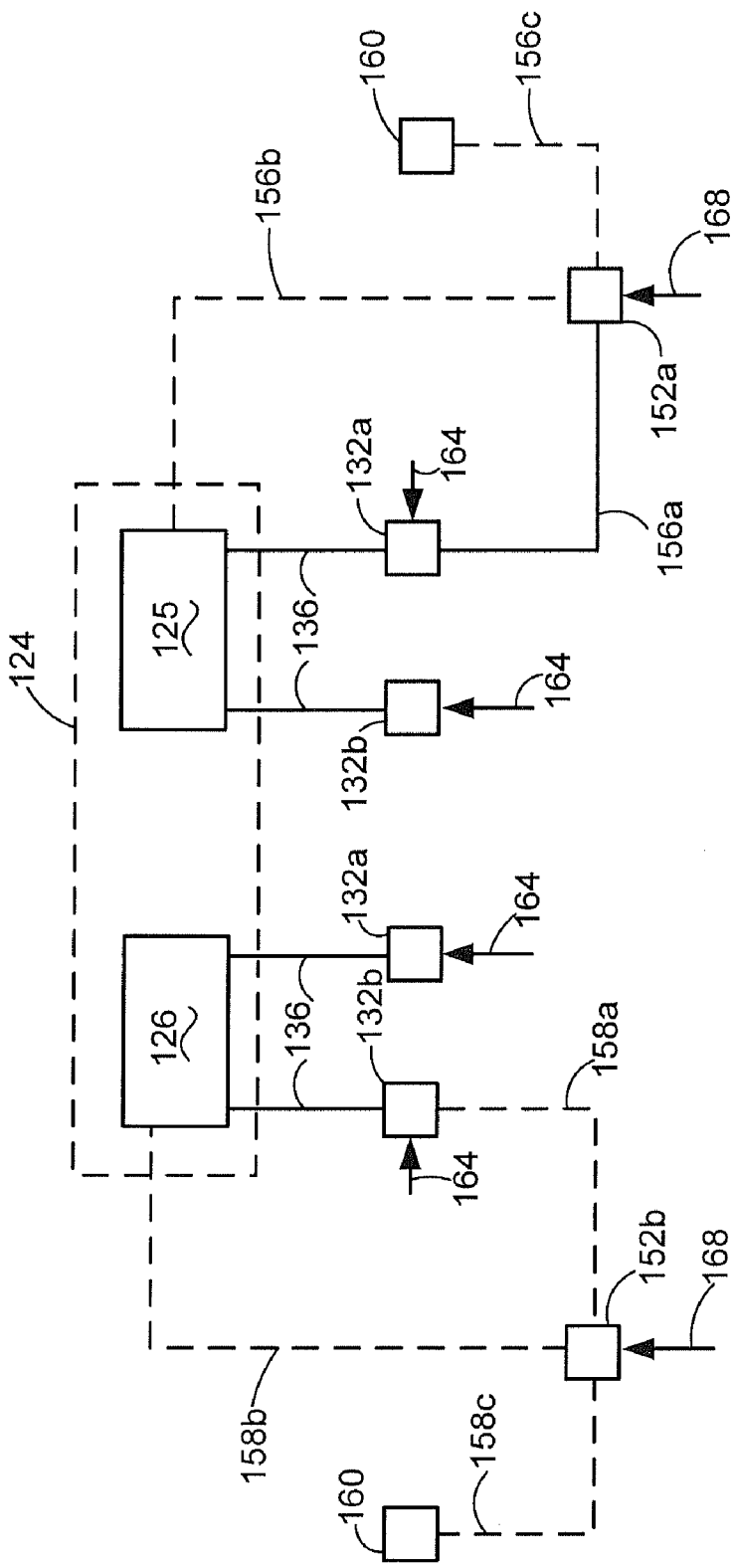

More options are illustrated in FIG. 7 for controlling a discharge from the suspension assembly 110 using the disk drive electrical interconnect 128 of FIG. 5 and for the configuration of the head 124 presented in FIG. 7. The charge dissipation electrical contact 140 of the disk drive electrical interconnect 128 of FIG. 5 may be in the form of a charge dissipation electrical contact 152a that is electrically interconnected with the read element 125 of the head 124 in accordance with FIG. 7. Generally, the series resistance from the read element 125 of the head 124, up to and including the charge dissipating contact electrical contact 152a, should be larger than the series resistance from the read element 125 of the head 124, up to and including its head input electrical contact 132a, and should also be larger than the series resistance from the read element 125 of the head 124, up to and including its head output electrical contact 132b.

Instead of using a separate resistor, as in the case of the FIG. 6 configuration (e.g., resistor 148a and/or 148b), the charge dissipation electrical contact 152a in the FIG. 7 embodiments itself has a sufficiently high resistance for purposes of dissipating an electrical charge from the read element 125 of the head 124. For instance, the charge dissipation electrical contact 152a may be in the form of what is commonly referred to as a static or electrostatic dissipative material. In some embodiments the charge dissipation electrical contact 152a itself has a resistance of at least about 100 k$\Omega$ (e.g., 100,000 Ohms). In other embodiments the charge dissipation electrical contact 152a itself has a resistance within a range from about 100 k$\Omega$ (e.g., 100,000 Ohms) to about 50 M$\Omega$ (e.g., 50,000,000 Ohms), inclusive. Other resistances may be appropriate depending upon the particular situation at hand. Again, the electrical charge should be discharged through the charge dissipation electrical contact 152a at a rate that should not damage the head 124. The general objective is to have a sufficiently high resistance to limit the magnitude of the transient current to a safe or reasonable level, yet also have a sufficiently low resistance so that the amount of time required to remove the electrical charge is not excessive.

One way of establishing an electrical path between the charge dissipation electrical contact 152a and the read element 125 of the head 124 is to have an electrical trace 156a that extends from the charge dissipation electrical contact 152a to one of the head electrical contacts 132a, 132b associated with the read element 125 (the head input electrical contact 132a in the illustrated embodiments.) Another way of establishing an electrical path between the charge dissipation electrical contact 152a and the read element 125 of the head 124 is to have an electrical trace 156b that extends from the charge dissipation electrical contact 152a directly to the read element 125 itself.

Prior to establishing contact with any of the head electrical contacts 132a, 132b of the disk drive electrical interconnect 128, a charge dissipation probe 168 or the like may be used to engage the charge dissipation electrical contact 152a of the disk drive electrical interconnect 128. An electrical charge that may exist on the read element 125 of the head 124 should thereby pass through the charge dissipation electrical contact 152a at a desired rate based upon its material selection and corresponding resistance. The charge dissipation probe 168 may remain engaged with the charge dissipation electrical contact 152a until the electrical charge should be sufficiently dissipated from the read element 125. Subsequent engagement of one or more test probes 164 or the like with one or more of the head electrical contacts 132a, 132b associated with the read element 125 should not damage the head 124 as a result of any electrical charge being rapidly transmitted from the read element 125 to any of its head electrical contacts 132a, 132b. Although the charge dissipation probe 168 could be disengaged from the charge dissipation electrical contact 152a at substantially the same time or after another test probe 164 has engaged any head electrical contact 132a, 132b associated with the read element 125 of the head 124, it may be preferable to leave the charge dissipation probe 168 engaged with the charge dissipation electrical contact 152a throughout the time that any test probe 164 is engaged with any of the head electrical contacts 132a, 132b for the write element 125 of the head 124. Once each test probe 164 is removed from each head electrical contact 132a, 132b of the disk drive electrical interconnect 128, the charge dissipation probe 168 may be removed from the charge dissipation electrical contact 152a of the disk drive electrical interconnect 128 as well.

Sufficient dissipation of the electrical charge from the suspension assembly 110 in accordance with the foregoing may not necessarily require that the charge dissipation electrical contact 152a of the disk drive electrical interconnect 128 be electrically interconnected with the read element 125 of the head 124. Other portions of the suspension assembly 110 or the head positioner assembly 100 may be at the same potential as the read element 125 of the head 124. It also may be that an electrical charge exists on the suspension assembly 110 that may not be removed via the read element 125. In this regard, the charge dissipation electrical contact 152a may be electrically interconnected with any appropriate metal component 160 of the head positioner assembly 100 using an electrical trace 156c. Generally, the series resistance from the metal component 160, up to and including the charge dissipation electrical contact 152a, may be larger than the series resistance from the read element 125 of the head 124, up to and including its head input electrical contact 132a, and may also be larger than the series resistance from the read element 125 of the head 124, up to and including its head output electrical contact 132b.

The charge dissipation electrical contact 140 of the disk drive electrical interconnect 128 of FIG. 5 also may be in the form of a charge dissipation electrical contact 152b that is electrically interconnected with the write element 126 in accordance with FIG. 7. Generally, the series resistance from the write element 126 of the head 124, up to and including the charge dissipation electrical contact 152b, should be larger than the series resistance from the write element 126 of the head 124, up to and including its head input electrical contact 132a, and should also be larger than the series resistance from the write element 126 of the head 124, up to and including its head output electrical contact 132b.

Instead of using a separate resistor, as in the case of the FIG. 6 configuration (e.g., resistor 148a and/or 148b), the charge dissipation electrical contact 152b in the FIG. 7 embodiment itself has a sufficiently high resistance for purposes of dissipating an electrical charge from the write element 126 of the head 124. For instance, the charge dissipation electrical contact 152b may be in the form of what is commonly referred to as a static or electrostatic dissipative material. In one embodiment, the charge dissipation electrical contact 152b itself has a resistance of at least about 100 kΩ (e.g., 100,000 Ohms). In another embodiment, the charge dissipation electrical contact 152b itself has a resistance within a range from about 100 kΩ (e.g., 100,000 Ohms) to about 50 MΩ (e.g., 50,000,000 Ohms), inclusive. Other resistances may be appropriate depending upon the particular situation at hand. Again, the electrical charge should be discharged through the charge dissipation electrical contact 152b at a rate that should not damage the head 124. The general objective is to have a sufficiently high resistance to limit the magnitude of the transient current to a safe or reasonable level, yet also have a sufficiently low resistance so that the amount of time required to remove the electrical charge is not excessive.

One way of establishing an electrical path between the charge dissipation electrical contact 152b and the write element 126 of the head 124 is to have an electrical trace 158a that extends from the charge dissipation electrical contact 152b to one of the head electrical contacts 132a, 132b associated with the write element 126 (the head input electrical contact 132b in the illustrated embodiments). Another way of establishing an electrical path between the charge dissipation electrical contact 152b and the write element 126 of the head 124 is to have an electrical trace 158b that extends from the electrical contact 152b directly to the write element 126 itself.

Prior to establishing contact with any of the head electrical contacts 132a, 132b of the disk drive electrical interconnect 128, a charge dissipation probe 168 or the like may be used to engage the charge dissipation electrical contact 152b of the disk drive electrical interconnect 128. An electrical charge that may exist on the write element 126 of the head 124 should thereby pass through the charge dissipation electrical contact 152b at a desired rate based upon its material selection and corresponding resistance. The charge dissipation probe 168 may remain engaged with the charge dissipation electrical contact 152b until the electrical charge should be sufficiently dissipated from the write element 126. Subsequent engagement of one or more test probes 164 or the like with one or more of the head electrical contacts 132a, 132b associated with the write element 126 should not damage the head 124 as a result of any electrical charge being rapidly transmitted from the write element 126 to any of its head electrical contacts 132a, 132b. Although the charge dissipation probe 168 could be disengaged from the charge dissipation electrical contact 152b at substantially the same time or after another test probe 164 has engaged with any head electrical contact 132a, 132b associated with the write element 126 of the head 124, it may be preferable to leave the charge dissipation probe 168 engaged with the charge dissipation electrical contact 152b throughout the time that any probe test 164 is engaged with any of the head electrical contacts 132a, 132b for the write element 126 of the head 124. Once each test probe 164 is removed from each head electrical contact 132a, 132b of the disk drive electrical interconnect 128, the charge dissipation probe 168 may be removed from the charge dissipation electrical contact 152b of the disk drive electrical interconnect 128 as well.

Sufficient dissipation of the electrical charge from the suspension assembly 110 in accordance with the foregoing may not necessarily require that the charge dissipation electrical contact 152b of the disk drive electrical interconnect 128 be electrically interconnected with the write element 126 of the head 124. Other portions of the suspension assembly 110 or the head positioner assembly 100 may be at the same potential as the write element 126 of the head 124. It also may be that an electrical charge exists on the suspension assembly 110 that may not be removed via the write element 126. In this regard, the charge dissipation electrical contact 152b may be electrically interconnected with any appropriate metal component 160 of the head positioner assembly 100 using an electrical trace 158c. Generally, the series resistance from the metal component 160, up to and including the charge dissipation electrical contact 152b, may be larger than the series resistance from the write element 126 of the head 124, up to and including its head input electrical contact 132a, and may also be larger than the series resistance from the write element 126 of the head 124, up to and including its head output electrical contact 132b.

It may be preferable to engage each of the charge dissipation electrical contact 152a (to dissipate an electrical charge from the read element 125 of the head 124) and the charge dissipation electrical contact 152b (to dissipate an electrical charge from the write element 126 of the head 124) with a separate charge dissipation probe 168 prior to establishing an external electrical contact with any of the head electrical contacts 132a, 132b. For instance, it may be possible that a voltage exists on the write element 126 of the head 124 that would not be dissipated through the charge dissipation electrical contact 152a that is electrically connected with the read element 125, and/or that a voltage exists on the read element 125 of the head 124 that would not be dissipated through the charge dissipation electrical contact 152b that is electrically connected with the write element 126. It also may be desirable to electrically interconnect one charge dissipation electrical contact 152a with the read element 125 of the head 124, to electrically interconnect another charge dissipation electrical contact 152a with a metal component 160, and to contact each such charge dissipation electrical contact 152a with separate charge dissipation probes 168 prior to contacting a test probe 164 with any of the head electrical contacts 132a, 132b. In addition, it may be desirable to electrically interconnect one charge dissipation electrical contact 152b with the write element 126 of the head 124, to electrically interconnect another charge dissipation electrical contact 152b with a metal component 160, and to contact each such charge dissipation electrical contact 152b with separate charge dissipation probes 168 prior to contacting a test probe 164 with any of the head electrical contacts 132a, 132b. Any combination of the various options discussed in relation to FIG. 7 may be used.

The various head electrical contacts and charge dissipation electrical contacts discussed herein may be of any appropriate size/shape/configuration, and further may be formed on or mounted to the flexible substrate 130 of the disk drive electrical interconnect 128 or other portions thereof. The various electrical traces discussed herein also may be of any appropriate size/shape/configuration (e.g., in the form of a thin line; a wire), and further may be formed on or mounted to the flexible substrate 130 of the disk drive electrical interconnect 128 or other portions thereof. What is important is that each such electrical trace provide an appropriate electrical path.

Any combination of the above-described options for using the charge dissipation electrical contacts 142a (FIG. 6), 142b (FIG. 6), 152a (FIG. 7), and 152b (FIG. 7) to dissipate a charge may be used (e.g., any of the options discussed above for the charge dissipation electrical contact 142a could be used in combination with any of the options discussed above for the charge dissipation electrical contact 152b). Moreover, any appropriate way of providing an electrical path of a sufficiently high resistance within the disk drive electrical interconnect 128 may be used for dissipating a charge from the head 124 of other portion of the suspension assembly 110 or head positioner assembly 100. Generally, the series resistance of the electrical charge dissipation electrical path should be larger than the series resistance from the head 124 to any of its electrical contacts 132a, 132b. In some embodiments each electrical charge dissipation path used by the disk drive electrical interconnect 128 has a series resistance of at least about 100 kΩ (e.g., 100,000 Ohms). In other embodiments each electrical charge dissipation path used by the disk drive electrical interconnect 128 has a series resistance within a range from about 100 kΩ (e.g., 100,000 Ohms) to about 50 MΩ (e.g., 50,000,000 Ohms), inclusive. Other resistances may be appropriate depending upon the particular situation at hand. Once again, the general objective is to have a sufficiently high resistance to limit the magnitude of the transient current to a safe or reasonable level, yet also have a sufficiently low resistance so that the amount of time required to remove the charge is not excessive.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the number and placement of components in the circuitry without departing from the spirit and scope of the present invention.

In addition, although the embodiments described herein are directed to a data storage device, it will be appreciated by those skilled in the art that the claimed subject matter is not so limited and various other electronics systems utilize the present embodiments without departing from the spirit and scope of the claimed invention.

The invention claimed is:

1. An electrical interconnect between a data transfer member and a control circuit, comprising:
a conductive lead electrically connected to the data transfer member and defining a conductive test pad contact that is selectively engageable with a removable test probe to operably communicate signals to and from the data transfer member; and
a charge dissipation circuit defining a conductive dissipation contact different than the test pad contact and disposed electrically in series with the test pad contact, wherein the dissipation contact is selectively engageable with a removable dissipation probe to operably dissipate an electrical charge from the data transfer member via a predetermined electrical resistance before and during the time when the signals are communicated to and from the data transfer member via the engagement of the test probe with the test pad contact.

2. The interconnect of claim 1 wherein the data transfer member comprises discrete read and write elements, wherein each of the read and write elements has a pair of the conductive leads defining respective test pad contacts.

3. The interconnect of claim 2 wherein the charge dissipation circuit comprises an electrical resistor.

4. The interconnect of claim 3 wherein the resistor has an electrical resistance of at least about 100 kΩ.

5. The interconnect of claim 3 wherein the resistor has an electrical resistance within a range from about 100 kΩ to about 50 MΩ.

6. The interconnect of claim 3 wherein the resistor comprises a thin film device.

7. The interconnect of claim 3 wherein the charge dissipation circuit comprises discrete electrical resistors associated with each of the read element and the write element.

8. The interconnect of claim 3 wherein the charge dissipation circuit comprises discrete dissipation contacts associated with each of the read element and the write element.

9. The interconnect of claim 3 wherein the electrical resistor is electrically in series with the data transfer member.

10. The interconnect of claim 9 wherein the electrical resistor is disposed between the data transfer member and the dissipation contact.

11. The interconnect of claim 9 wherein the electrical resistor is electrically in series with at least one of the read element and the write element.

12. The interconnect of claim 9 wherein the charge dissipation circuit comprises discrete electrical resistors associated with each of the read element and the write element.

13. The interconnect of claim 9 wherein the charge dissipation circuit comprises discrete dissipation contacts associated with each of the read element and the write element.

14. The interconnect of claim 3 wherein the electrical resistor is electrically in series with a conductive support member supporting the data transfer member.

15. The interconnect of claim 14 wherein the electrical resistor is disposed between the support member and the dissipation contact.

16. The interconnect of claim 14 wherein the electrical resistor is electrically in series with at least one of the read element and the write element.

17. The interconnect of claim 14 wherein the charge dissipation circuit comprises discrete electrical resistors associated with each of the read element and the write element.

18. The interconnect of claim 14 wherein the charge dissipation circuit comprises discrete dissipation contacts associated with each of the read element and the write element.

19. The interconnect of claim 2 wherein the dissipation contact comprises an electrically conductive dissipative material.

20. The interconnect of claim 19 wherein the dissipation contact has an electrical resistance of at least about 100 kΩ.

21. The interconnect of claim 19 wherein the dissipation contact has an electrical resistance within a range from about 100 kΩ to about 50 MΩ.

22. The interconnect of claim 19 wherein the charge dissipation circuit comprises discrete dissipation contacts associated with each of the read element and the write element.

23. The interconnect of claim 19 wherein the dissipation contact is electrically in series with the data transfer member.

24. The interconnect of claim 23 wherein the charge dissipation circuit comprises discrete dissipation contacts associated with each of the read element and the write element.

25. The interconnect of claim 23 wherein the dissipation contact is electrically in series with a conductive support member supporting the data transfer member.

26. The interconnect of claim 23 wherein the dissipation contact is electrically in series with at least one of the support members associated with the read element and the write element.

27. The interconnect of claim 23 wherein the charge dissipation circuit comprises discrete dissipation contacts associated with each of the read element and the write element.

28. A method comprising:
selectively engaging a removable test probe against a test pad contact of an interconnect that is electrically connected to a data transfer member for communicating signals to and from the data transfer member; and
selectively engaging a removable dissipation probe, different than the test probe, against a dissipation contact, different than the test pad contact and electrically in series with the test pad contact, of a charge dissipation circuit to dissipate an electrical charge from the data transfer member via a predetermined electrical resistance before and during the selectively engaging the test probe against the test pad contact step.

29. The method of claim 28 wherein the selectively engaging the test probe against the test pad contact step is characterized by communicating signals to at least one of a read element and a write element of the data transfer member.

30. The method of claim 28 wherein the selectively engaging the dissipative probe against the dissipation contact step is characterized by the predetermined electrical resistance being at least about 100 kΩ.

31. The method of claim 28 wherein the selectively engaging the dissipative probe against the dissipation contact step is characterized by the predetermined electrical resistance being substantially within a range from about 100 kΩ to about 50 MΩ.

32. The method of claim 29 wherein the selectively engaging the dissipative probe against the dissipation contact step is characterized by achieving the predetermined electrical resistance by employing an electrical resistor in the charge dissipation circuit.

33. The method of claim 32 wherein the selectively engaging the dissipative probe against the dissipation contact step is characterized by placing the electrical resistor in series with a conductive support member supporting the at least one of the read element and the write element and in parallel with the test pad contact.

34. The method of claim 32 wherein the selectively engaging the dissipative probe against the dissipation contact step is characterized by employing discrete electrical resistors for the at least one of the read element and the write element in the charge dissipation circuit.

35. The method of claim 32 wherein the selectively engaging the dissipative probe against the dissipation contact step is characterized by employing discrete dissipation contacts for the at least one of the read element and the write element in the charge dissipation circuit.

36. The method of claim 29 wherein the selectively engaging the dissipative probe against the dissipation contact step is characterized by achieving the predetermined electrical resistance by the dissipation contact comprising a conductive dissipative material in the charge dissipation circuit.

37. The method of claim 36 wherein the selectively engaging the dissipative probe against the dissipation contact step is characterized by placing the dissipation contact in series with a conductive support member supporting the at least one of the read element and the write element.

38. The method of claim 36 wherein the selectively engaging the dissipative probe against the dissipation contact step is characterized by employing discrete electrical resistors for the at least one of the read element and the write element in the charge dissipation circuit.

39. The method of claim 32 wherein the selectively engaging the dissipative probe against the dissipation contact step is characterized by employing discrete dissipation contacts for the at least one of the read element and the write element in the charge dissipation circuit.

* * * * *